United States Patent [19]

Virag

[11] 4,121,738
[45] Oct. 24, 1978

[54] APPARATUS FOR THE CONTINUOUS FEEDING OF PLURAL LIQUIDS IN SEPARATE STREAMS OF ADJUSTABLE QUANTITY AND RATIO

[75] Inventor: Gyorgy Virag, Budapest, Hungary

[73] Assignee: Muanyagipari Kutato Intezet, Budapest, Hungary

[21] Appl. No.: 767,141

[22] Filed: Feb. 9, 1977

[30] Foreign Application Priority Data

Feb. 17, 1976 [HU] Hungary ............................ MU 556

[51] Int. Cl.² .......................... B67D 5/44; F15B 15/24
[52] U.S. Cl. .................................... 222/134; 222/139; 92/13.6; 92/13.7
[58] Field of Search ............... 222/134, 135, 138, 139, 222/140, 141, 142, 287, 309, 311; 417/481, 482; 92/122, 123, 13.4, 13.6, 13.7, 84

[56] References Cited

U.S. PATENT DOCUMENTS

| | | | |
|---|---|---|---|
| 1,563,319 | 12/1925 | Bates | 417/482 |
| 2,638,847 | 5/1953 | McGowan | 222/134 X |
| 3,386,623 | 6/1968 | Berrill et al. | 222/134 |
| 3,655,094 | 4/1972 | Hobbs | 222/134 X |
| 3,790,030 | 2/1974 | Ives | 222/135 |
| 3,901,408 | 8/1975 | Boden et al. | 222/134 |

Primary Examiner—Robert B. Reeves
Assistant Examiner—Francis J. Bartuska
Attorney, Agent, or Firm—Young & Thompson

[57] ABSTRACT

Apparatus for the continuous feeding of plural liquids in separate streams of adjustable quantity and ratio, comprises a drive unit that drives a main pump, and that also drives at least one secondary pump. The drive unit has an oscillating or reciprocating movement, and so the pumps are piston pumps or oscillating vane-type pumps. The stroke of the secondary pump or pumps may be selectively shortened without shortening that of the main pump, so as to predetermine the proportions of the liquids to each other. The system is particularly applicable for the feeding of separate streams of synthetic resins by the main pump, and the associated hardeners, catalysts, accelerators or other auxiliary liquids by the secondary pump or pumps.

6 Claims, 12 Drawing Figures

APPARATUS FOR THE CONTINUOUS FEEDING OF PLURAL LIQUIDS IN SEPARATE STREAMS OF ADJUSTABLE QUANTITY AND RATIO

The present invention relates to apparatus for the continuous and simultaneous feeding of a plurality of liquid streams, for example a synthetic resin and the associated hardeners, catalysts, accelerators and other auxiliary liquids, in a predetermined and adjustable quantity and ratio. This equipment is characterized by a driving unit having reciprocating or oscillating movement, and feeding pumps of variable piston displacement that are continuously in mechanical driving connection with the driving unit. Associated transmission, reversal, control and/or regulation elements connect all the structural units into one operating system.

A number of types of apparatus are already known for the delivery of synthetic resins and secondary components. In one of these, the resin and the hardener are delivered by means of adjustable valves from receptacles under pressure in a predetermined desired quantity and ratio to a dispensing station.

The drawback of this known apparatus is its unreliability and its delivery of the liquid according to the applied pressure. Hence this system can be used only for the delivery of liquids of low viscosity.

In another known type of apparatus the synthetic resin is delivered by a piston pump while the delivery of the hardener is effected by the aid of air pressure in a receptacle, as described above. In this case, the same difficulties are encountered. The fundamental drawback of both systems is that when changing the quantity of synthetic resin delivered, the quantity of hardener remains unchanged and so the ratio of these two liquids will change.

In another known type of apparatus, both the synthetic resin and the hardener are delivered by means of piston pumps that are connected to the piston rod of the resin pump through mechanical lever arms. By changing the ratio of the lever arms, the feed ratios of the liquids can be adjusted as desired. The drawback of this system is that because of the use of lever arms, a pressure of several hundred atmospheres may be produced in the pump for the hardener, and so the use of a safety valve is required. Failure of the safety valve has resulted in accidents in a number of cases. Moreover, the mechanical lever arm contains rotating and sliding elements, which are easily damaged in operation. Still further, the movement of the lever arms consumes a great deal of energy. The large volume required for accommodating the mechanical lever arms is perhaps the most disadvantageous feature of the system. Thus, the common drive of several charging pumps with simultaneous delivery of several liquids involves considerable difficulties. A device using such lever arms is disclosed in U.S. Pat. No. 3,790,030.

The present invention overcomes the difficulties of the known apparatus set forth above, by providing a feeding pump system characterized by reciprocating or oscillating strokes, in which the required proportions can be easily maintained. A single stroke performs a complete operating cycle in each feeding unit. However, the strokes of the various units may not be coextensive or of the same duration; but this is unimportant, because the overall delivery of the system is greater than the quantity delivered during an individual stroke, by several orders of magnitude. Moreover, any irregularities of feeding can be avoided by the provision of a resilient means in the system, such as a resilient conduit or an accumulator.

It is also possible, by the practice of the present invention, to handle any desired number of different liquids, merely by mechanically interconnecting the feeding pumps and driving units.

The present invention is based on the recognition that it is not necessary to provide complete synchronism of movement within a given operating cycle, between the various units. Thus, it is possible to terminate the working stroke as to one unit before the end of the working stroke of another unit, the resultant individual change of stroke or piston displacement of the feed pump being effected without interrupting the mechanical connections.

It is thus possible, by the present invention, to provide feed units that incorporate only mechanical elements, and that are synchronized but not rigidly interconnected. The present invention ensures accurate proportioning even with low displacement and consequent low flow rates of liquid.

The present invention utilizes pumps of the reciprocating or oscillating type, of simple construction, whereby uniform flow of liquids and the ready adjustment of the proportions of the liquids can be easily achieved.

It is also possible, according to the present invention, to provide plural outlets for the pumps without disturbing the desired proportional flow.

The present invention accordingly provides apparatus as described above, in which the driving unit is mechanically connected on the one hand on the main component pump, and on the other hand to a pump or pumps delivering at least one secondary component, the latter connection being characterizted by a unit that undergoes the same cycle of movement as the main pump but whose stroke is adjustable so as not to to be necessarily of the same duration as the stroke of the main pump.

In a preferred embodiment of the invention, the stroke-changing unit comprises an adjustable member that limits the stroke of the pump associated with the secondary component, there being a connection that permits lost motion between the piston rod of the secondary pump and its driver.

According to another advantageous feature of the invention, the pumps for plural secondary components are driven in series, thereby to deliver the secondary components in parallel streams. Such pumps and drive units are preferably of the oscillating type.

The present invention has, among others the following advantages over the known apparatus of this type:

(a) Compared to known devices, it contains fewer movable parts, with corresponding reduction in mechanical difficulties and energy consumption.

(b) If the flow rate of the main component is changed, then the flow rates of the secondary components will automatically change while maintaining the predetermined proportion thereof.

(c) It is possible to feed a plurality of secondary components with operational safety, easy manipulation and substantial savings in materials.

(d) No safety valve is needed.

(e) The equipment is useful with liquids of the same or different viscosities.

(f) The use of reciprocating or oscillating drive units results in more compact units than heretofore.

Other features and advantages of the present invention will become apparent from a consideration of the following description, taken in connection with the accompanying drawings, in which.

Figure 1:
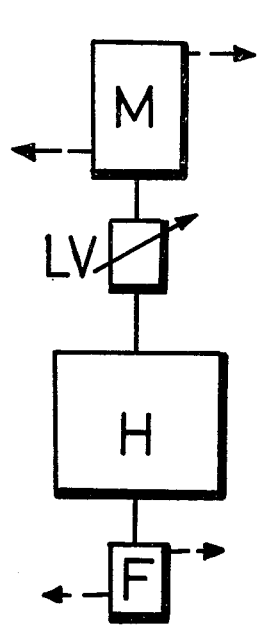
FIG. 1 is a diagrammatic view of a first embodiment of apparatus according to the present invention.

Referring now to the drawings in greater detail, and first to FIG. 1 thereof, there is shown a pump F for the delivery of the main component which is connected directly to the driving unit H that performs either oscillatory or reciprocatory movement. A pump M delivers the secondary component and is connected to the driving unit through a stroke-changing unit LV. The stroke frequency and/or the length of the stroke of the driving unit H can be varied, and so the delivery capacity of the pump F can be predetermined. By adjusting the stroke-changing unit LV, in a way that will be described in greater detail later on, the ratio of the secondary component to the main component can be changed. Due to the lost motion connection to be described hereinafter, the displacement stroke of the pump M will be completed in one direction earlier and started in the other direction later than that of the driving unit H and the pump F, However, the total cycle time per stroke will be identical for pumps M and F and will be synchronized, so that the two pumps operate with the same frequency. In this way, the predetermined component ratio between pumps F and M remains constant.

Figure 2:
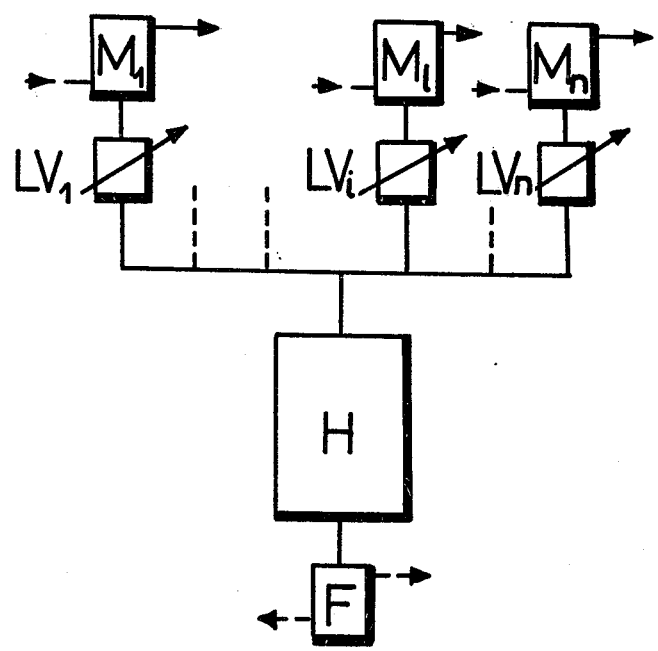
FIG. 2 is a view similar to FIG. 1, but for the simultaneous feeding of a plurality of secondary components.

FIG. 2 shows an arrangement in which the same driving unit H simultaneously drives n pumps M for the delivery of a plurality of parallel streams of secondary components Otherwise, the operation is the same as in FIG. 1.

Figure 3:
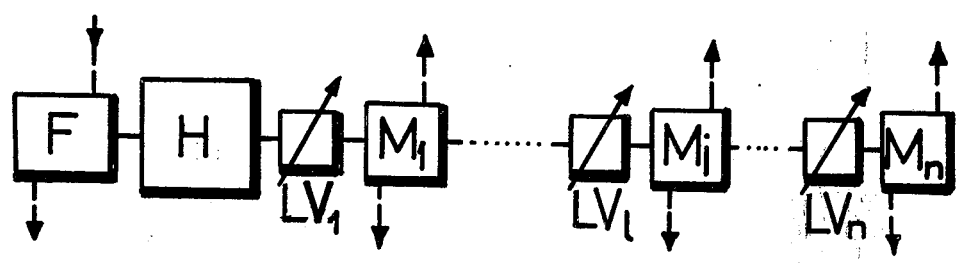
FIG. 3 is a view similar to FIGS. 1 and 2, but with the drive of the secondary components in series in FIG. 3 instead of in parallel as in FIG. 2.

FIG. 3 shows another possible arrangement for the operation of n pumps M for the delivery of plural secondary component streams in parallel. In this case, the stroke-changing units LV and the pumps M are connected in series to an output element or driven shaft of the driving unit H, which output element can perform either a reciprocatory movement along its axis, or an oscillatory movement in rotation about its axis. Thus, the units LV and M drive each other in series.

Figure 4:
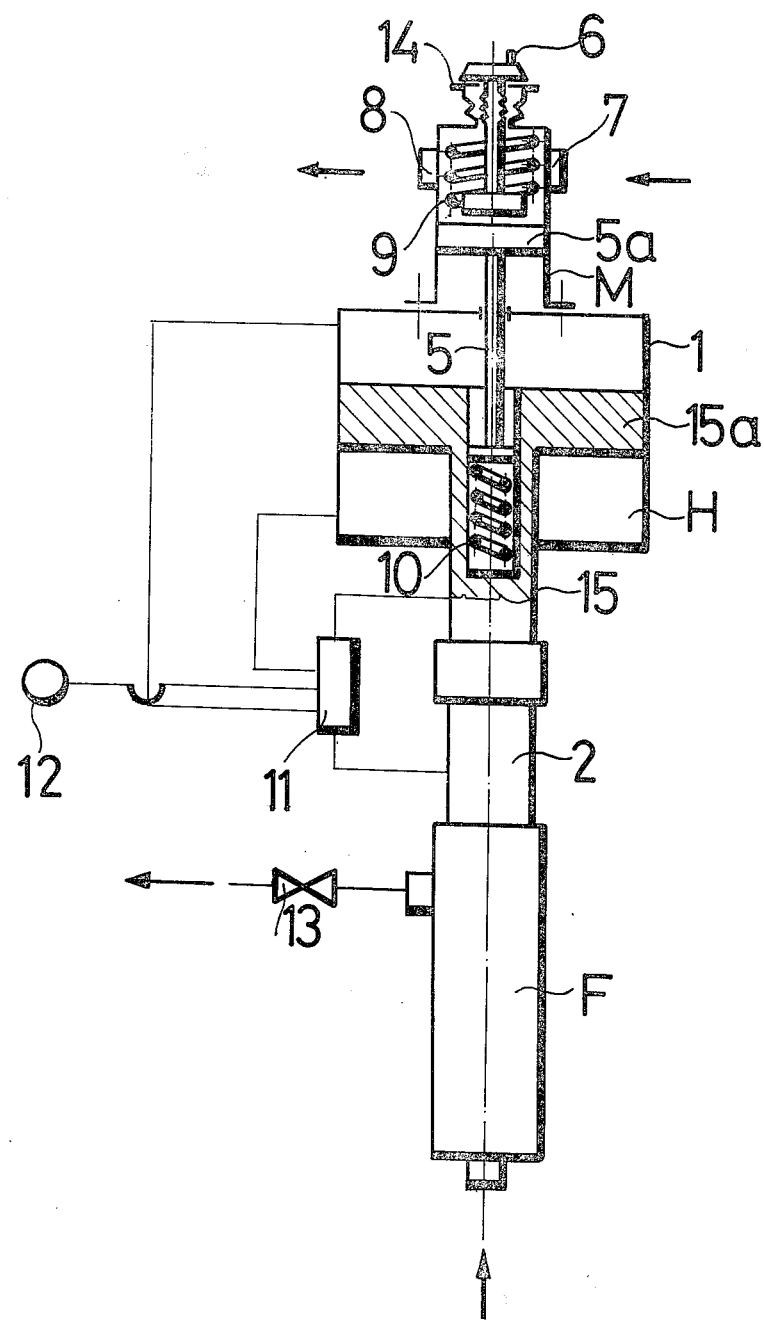
FIG. 4 is a diagrammatic cross-sectional view of apparatus according to the present invention of the reciprocating stroke type.

The embodiment shown in FIG. 4 comprises a working cylinder 1 of the driving unit H that actuates a pump F for delivery of the main component, by means of a piston 15a having piston rods 2 and 15 thereon. Pump F delivers synthetic resin. Piston 15a and its rod 15 drive a piston 5a through a spring 10 and a piston rod 5, thereby to actuate the pump M delivering the secondary component. The stroke length of the piston 5a and hence the displacement of pump M, can be varied by means of an adjusting member 6 whose setting is predetermined according to the reading on a scale 14, by rotating member 6 on a scrw-threaded seat by which the member 6 is advanced or retracted along its axis. Spring 9 urges piston 5a downwardly as seen in FIG. 4; while piston 15a via spring 10 urges piston 5a upwardly as seen in FIG. 4. Pressure medium for the operation of the driving unit is led from a source thereof at 12, alternately via reversing mechanism 11 to each side of cylinder 1. The quantity of synthetic resin delivered can be controlled by means of valve 13 or by changing the pressure of the actuating medium; and the speed of the strokes of the piston rods 2 and 5 will correspondingly change.

In connection with FIG. 4, it is to be understood that the adjusting member 6 halts the piston 5 short of what would be the full stroke of piston 5 under the influence of piston 15a. The stroke of piston 15a thus continues after that of 5a has stopped, in one direction, and commence before that of 5a begins in the opposite direction. In other words, there is a dwell or lost motion connection, between pistons 5a and 15a, with the stroke of piston 5a being adjustable in duration up to the duration of the stroke of piston 15a; although it is to be expected that the stroke of piston 5a will ordinarily be shorter in duration than that of piston 15a. Nevertheless, the total cycle time for pistons 5a and 15a is identical.

Figure 5:
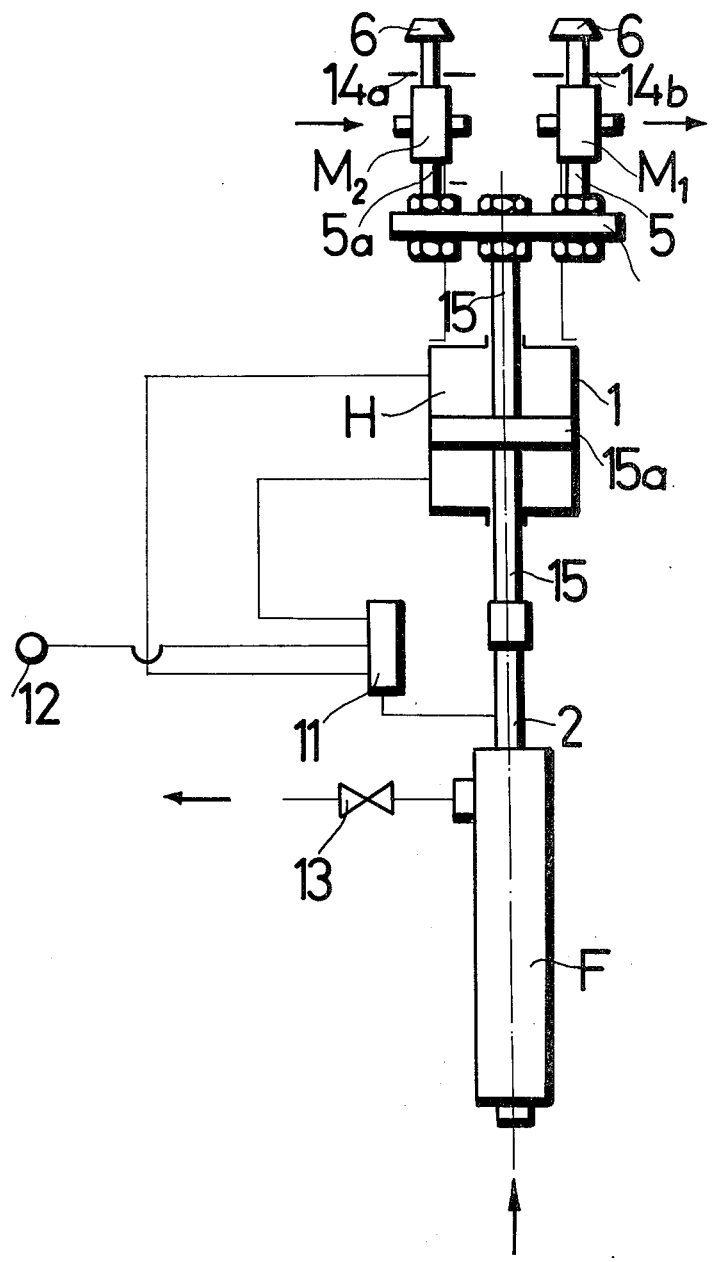
FIG. 5 is a view similar to FIG. 4, but for the dispensing of two secondary components.

FIG. 5 shows an arrangement in which the piston rod 15, in addition to actuating the pump F, at its other end carries a head 16 that operates two pumps $M_1$ and $M_2$ for the delivery of two streams of secondary components in parallel.

Figure 6:
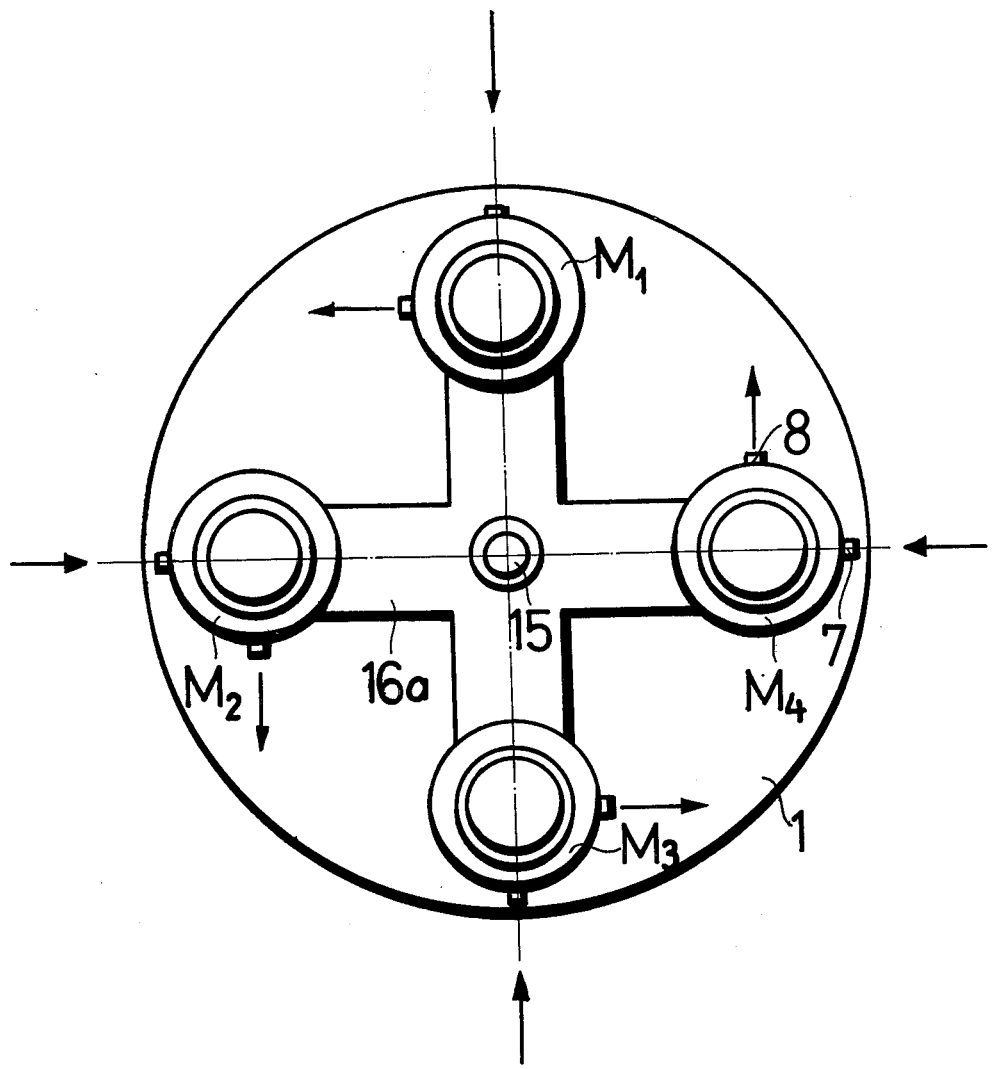
FIG. 6 is an end view of apparatus as in FIGS. 4 and 5, but for the dispensing of four secondary components.

FIG. 6 shows, in end view, an arrangement similar to that of FIG. 5, but in which the head 16a actuates the piston rods of pumps $M_1$-$M_4$, all delivering parallel streams of secondary components.

Figure 7:
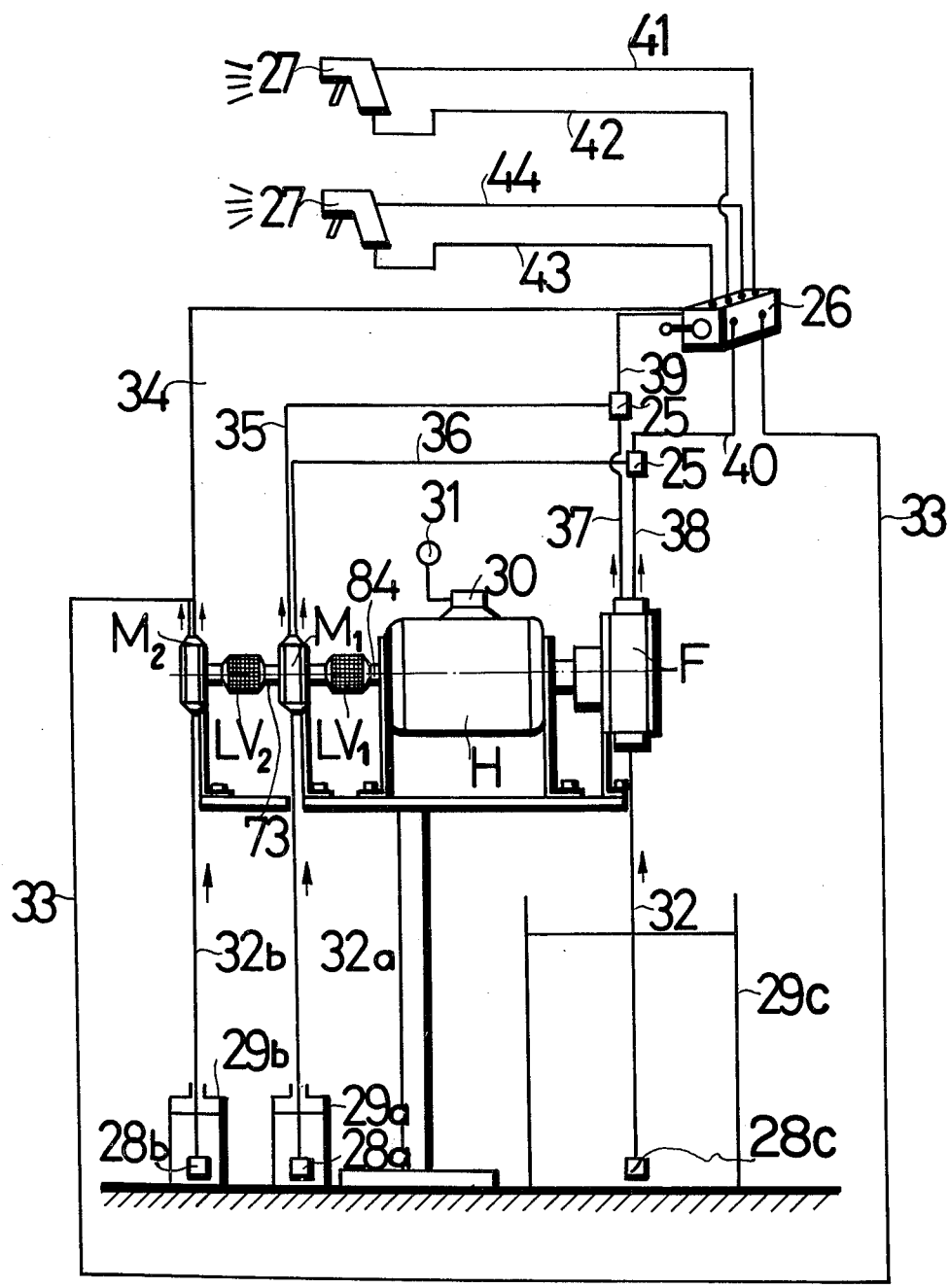
FIG. 7 is a diagrammatic view of an embodiment of the invention in which oscillatory movement is used for the continuous feeding of the main component and two secondary components, to two spray guns which can be operated separately or simultaneously from two pressure outlets, independently of each other.

FIG. 7 shows another embodiment of the invention, comprising a driving unit H and a pump F driven thereby to deliver the main component. Pumps $M_1$ and $M_2$ deliver parallel streams of secondary components, each having respectively a stroke-changing unit $LV_1$ and $LV_2$, with which the proportions of the three streams relative to each other can be selectively individually altered. Pump $M_1$ and stroke-changing unit $LV_2$ are connected to each other by axle 73. Driving unit H, driven through a power source 31, imparts oscillatory movement to its output shafts at opposite ends thereof, of a stroke length, that is, an angular displacement, that is adjustable according to a conventional control element 30. Pump F thus draws main component from receptacle 29c through filter 28c and intake conduit 32c and pumps the same under pressure through conduits 37 and 38. Pumps $M_1$ and $M_2$, delivering the respective secondary components and having the same stroke cycle time as pump F, are connected via the output shaft 84 of driving unit H through the stroke-changing units LV₁ and LV₂.

Pump M₁ draws one secondary component from receptacle 29a through filter 28a and intake conduit 32a and delivers that secondary component under pressure through conduits 35 and 36 into mixing valves 25, in which mixing of the secondary and main components takes place. From here, and mixed components flow through conduits 39 and 40 into control valve 26.

Pump M₂ draws the other secondary component from receptacle 29b through filter 28b and intake conduit 32b and delivers the same under pressure through conduits 33 and 34 directly into valve 26. In one of its positions, valve 26 connects the liquid from conduits 39 and 40 to the conduits 42 and 43; while the liquid from conduits 33 and 34 is connected to conduits 41 and 44. In this position of valve 26, only one of the spray guns 27 and can be operated, and the entire liquid output passes through only a single spray gun. In another position of valve 26, the liquid from conduit 39 is connected to conduit 43 and the liquid from conduit 40 to conduit 42. The liquid from conduit 43 is connected to conduit 41 and the liquid from conduit 34 is connected to conduit 44. In this case, both spray guns 27 can be simultaneously actuated, one-half the entire liquid quantity being delivered by pumps F and M₁ passing through conduit 42 while the other half passes through conduit 43; while at the same time, half the entire liquid delivered by pump M₂ passes through conduit 41 while the other half passes through conduit 44. If the spray guns 27 impose different resistances on the flow of liquid therethrough, then speed of oscillation of the drive unit will be different in opposite directions, as will be apparent from the following description of the pumps.

Figure 8:
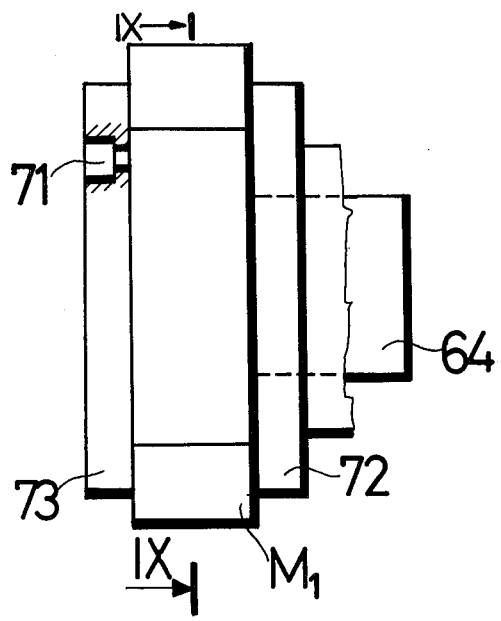
FIG. 8 is an elevational view of the oscillating pump $M_1$ used in the embodiment of FIG. 7.
Figure 9:
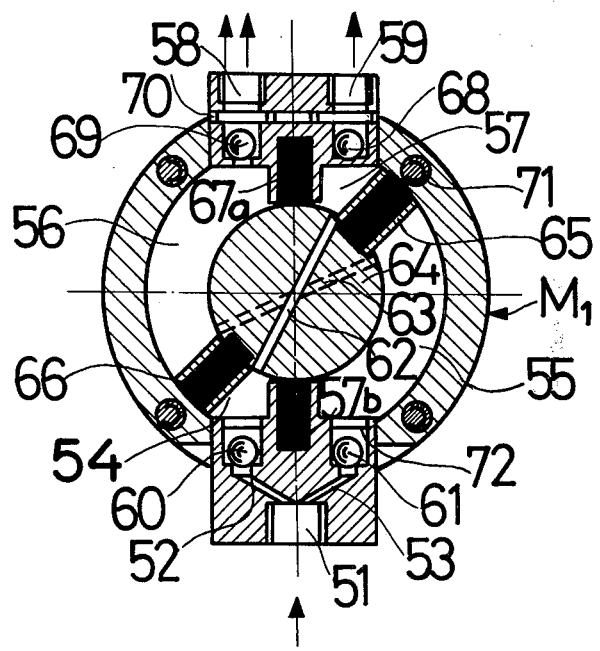
FIG. 9 is a cross-sectional view taken on the line IX—IX of FIG. 8.

FIGS. 8 and 9 show a preferred embodiment of pump M for delivering a secondary component, comprising broadly a stator or casing and a rotor 64 that oscillates within that casing with the oscillatory movement imposed thereon by driving unit H. The stator is closed at its ends by covers 72 and 73 held in place by screws 71. The rotor 64 extends through one or both covers at opposite ends of the pump, depending on whether the pump is at the end of the series of pumps or intermediate the series of pumps.

Considering first the stroke of rotor 64 as it moves in a clockwise direction as seen in FIG. 9, the chambers 54 and 57 will simultaneously enlarge while chambers 55 and 56 simultaneously decrease in volume. Ball 60 will thus be raised from its seat to permit intake of secondary component from a common inlet 51 therefor, through channel 52, past raised ball 60 and into chamber 54, through channel 62 that traverses rotor 64, and into chamber 57, the ball 68 being held down on its seat thereby to maintain outlet 59 closed. At the same time, ball 72 is forced down on its seat to prevent the flow of secondary component from chamber 55 back out through channel 53; and so the secondary component in chamber 55 is forced through channel 63 that traverses rotor 64 separately from channel 62, into chamber 56 whence it raises ball 69 and passes out through outlet 58, under the influence of the vanes 65 and 66 that are carried by rotor 64 and that sweep the side walls of the stator in sealed relation therewith. Chambers 55 and 57 are separated from chambers 54 and 56, by fixed seals 67a and 67b.

When rotor 64 has reached the end of its stroke in a clockwise direction, the driving unit H reverses its sense of rotation and rotor 64 rotates in a counterclockwise direction as seen in FIG. 9, whereupon the above operations are reversed, that is, ball 60 is held down and ball 68 is raised so that liquid is forced from chambers 54 and 57 through outlet 59; and ball 61 is raised and ball 69 held down, so that secondary component is drawn through inlet 51 and channel 53 past the raised ball 61 into chambers 55 and 56 in preparation for the next cycle. The movement of rotor 64 through one complete clockwise movement and one complete counterclockwise movement thereof, constitutes a complete cycle of the apparatus.

Figure 10:
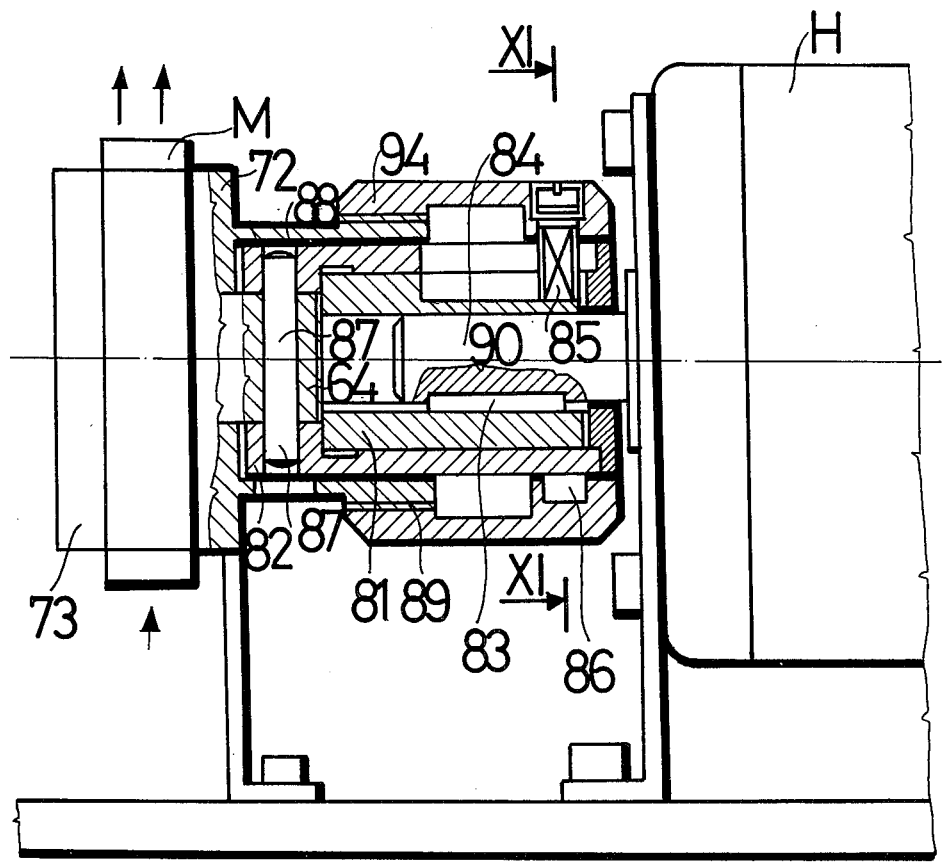
FIG. 10 is a fragmentary cross-sectional view of the stroke changing unit $LV_1$ of the apparatus shown in FIG. 7.
Figure 11:
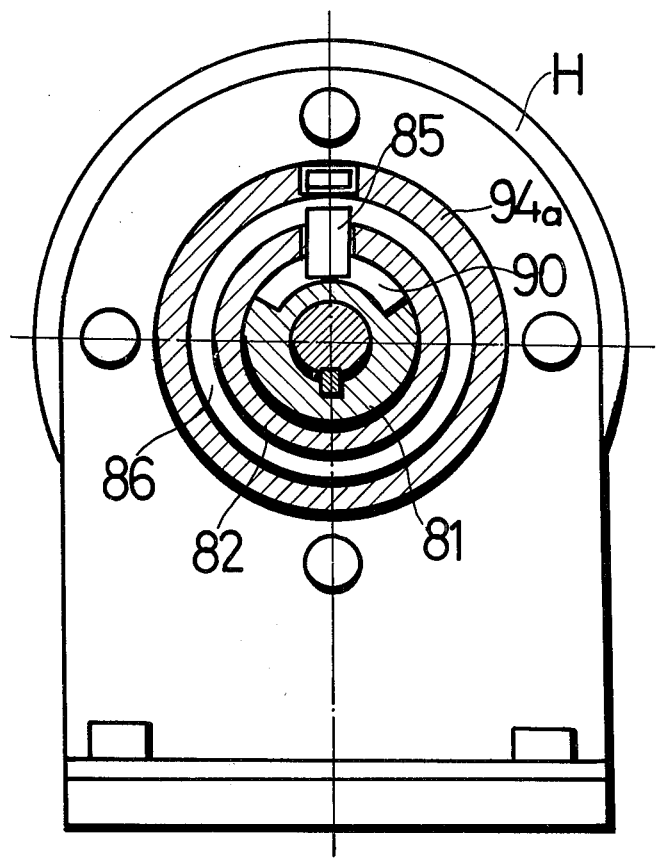
FIG. 11 is a cross-sectional view taken on the line XI—XI of FIG. 10.
Figure 12:
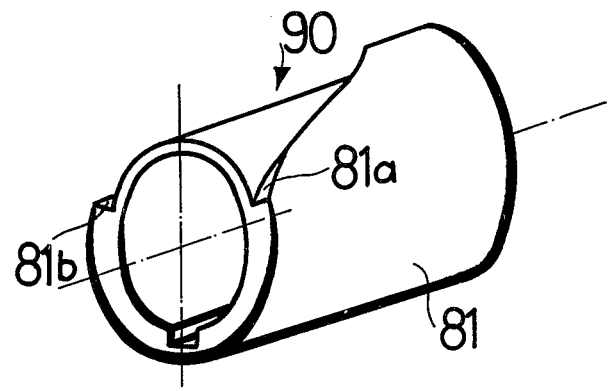
FIG. 12 is a perspective view of the element in the structure of FIGS. 10 and 11 that permits adjustment of the length of the strokes.

Just as the linear displacement of piston 5a in FIG. 4 was adjustable thereby to vary the stroke of pump M in FIG.. 4, so also the angular displacement of rotor 64 is adjustable thereby to limit the stroke of the pumps M for the same purpose, that is, to vary the proportion of the components fed by the pumps M and F. One embodiment of mechanism for doing this is shown in FIGS. 10-12. FIG. 10 shows a stroke-changing unit LV₁ interposed between driving unit H and pump M₁, comprising a sleeve 81 fixed by a key 83 on output shaft 84 of driving unit H. A flat-ended driving pin 85 is received in a recess 90 machined in sleeve 81. Recess 90 is bounded by converging edges 81a, 81b shown in FIG. 12. It is to be understood that the left end of sleeve 81 in FIG. 12 appears as the right end of sleeve 81 in FIG. 10.

Pin 85 is slidable lengthwise in a slot in a sleeve 82, this slot extending parallel to the axis of the sleeve 82. Sleeve 82, in turn, is releasably fixed to the rotor 64 of pump M₁ by a dowel pin 87. Sleeve 81 is supported in bearings in sleeve 82. A sleeve 94a has a knurled outer surface and is screw-threaded internally to be adjustable lengthwise of and on a flange 89 on the cover 72 of pump M₁. In this way, by mainpulation of sleeve 94a, the position of sleeve 94a can be adjusted lengthwise of unit LV₁, to a position shown by scale 88 on flange 89, and hence the pin 85 can be shifted lengthwise, that is, in a direction parallel to the axis of sleeve 81, within the groove 90 machined in sleeve 81. In other words, pin 85 can thus be shifted to the left or right as seen in FIG. 10. The other or outer end of pin 85 moves freely in an annular groove 86 in sleeve 94a.

As shaft 84 rotates, and drives sleeve 81, there will thus be a dwell of selectively variable length, represented by the rotation of sleeve 81 relative to the pin 85 during that time when pin 85 is crossing groove 90 between the surfaces 81a and 81b. When pin 85 contacts either one of these latter surfaces, then continued rotation of sleeve 81 in the same direction will carry pin 85 with it, and so will drive sleeve 82 and hence rotor 64 for the remainder of the stroke of shaft 84. In the opposite direction, when shaft 84 reverses its direction of rotation, pin 85 will leave the surface 81a or 81b with which it is then in contact, and will pass through groove 90 until it contacts the other surface 81a and 81b, and will thereafter drive sleeve 81 and rotor 64 in the opposite direction. It is of course apparent from FIG. 11 that pin 85 is thus drivingly connected only to sleeve 82 and not to sleeve 94a.

The movement of pin 85 to the left or right in groove 90, as seen in FIG. 10, thus position pin 85 in a selectively wider or narrower portion of groove 90, as will be evident from FIG. 12, and so predetermines the dwell time or lost motion between shaft 84 and rotor 64. In this way, the proportion of the secondary component pumped by pump M₁, is selectively adjustable relative to the main component pumped by pump F.

From a consideration of the foregoing disclosure, therefore, it will be evident that the initially recited purposes of this invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview of the scope of the present invention as defined by the appended claims.

What is claimed is:

1. Apparatus for the continuous feeding of plural liquids in separate streams of adjustable quantity and ratio, comprising a plurality of pumps one individual to each of said liquids, drive means common to all said pumps for driving said pumps with to-and-fro strokes, means between said drive means and at least one of said pumps for selectively individually altering the length of said strokes of said at least one pump while maintaining constant the frequency of said strokes of said at least one pump, said pumps being reciprocatory piston pumps and said stroke varying means comprising mans for limiting the length of the stroke of a piston of at least one said pump relative to the length of the stroke of the piston of at least one other said pump, said stroke length altering means comprising abutment means selectively movable into different positions to engage said piston of said at least one pump, a lost motion connection between said pistons, and spring means acting between said pistons to urge said pistons apart.

2. Apparatus as claimed in claim 1, there being a plurality of said pumps connected to a single output of said drive means, there being a single pump connected to another output of said drive means.

3. Apparatus as claimed in claim 2, the first mentioned output comprising a plurality of piston rods individually connected to a plurality of said pumps.

4. Apparatus as claimed in claim 3, there being a plurality of said pumps driven from each other in series.

5. Apparatus for the continuous feeding of plural liquids in separate streams of adjustable quantity and ratio, comprising a plurality of pumps one individual to each of said liquids, drive means common to all said pumps for driving said pumps with to-and-fro strokes, means between said drive means and at least one of said pumps for selectively individually altering the length of said strokes of said at least one pump while maintaining constant the frequency of said strokes of said at least one pump, said drive means imparting oscillatory movement to said pumps, said altering means limiting the angular displacement of said at least one pump, said altering means comprising a connection between said driving means and said at least one pump that includes a pin that turns in a slot whose width varies in a direction parallel to the axis of oscillation of said at least one pump, and means for moving said pin and slot relative to each other parallel to said axis.

6. Apparatus as claimed in claim 5, said at least one pump of the rotary vane type having two outlets for fluid under pressure.

* * * * *